United States Patent [19]
Fukushi et al.

[11] 3,933,710
[45] Jan. 20, 1976

[54] ASPHALT COMPOSITION

[75] Inventors: Naobumi Fukushi, Tokyo; Hideaki Nakazawa, Yokohama; Junichi Soshizaki, Tokyo; Tetsuo Iikuni, Yokohama, all of Japan

[73] Assignee: Toyo Sodo Manufacturing Co., Ltd., Japan

[22] Filed: June 26, 1974

[21] Appl. No.: 483,398

[30] Foreign Application Priority Data
June 29, 1973 Japan............................ 48-73446

[52] U.S. Cl............................................. 260/28.5 AS
[51] Int. Cl.²........................................ C08L 91/00
[58] Field of Search............................ 260/28.5 AS

[56] References Cited
UNITED STATES PATENTS
3,464,156  9/1969  Rogers et al................. 260/28.5 AS OTHER PUBLICATIONS
Gaylord, Polyethers, Part I, Interscience, NY, 1963, pp. 107–108.

*Primary Examiner*—M. J. Welsh
*Attorney, Agent, or Firm*—Oblon, Fisher, Spivak, McClelland & Maier

[57] ABSTRACT

A latex-asphalt emulsion composition comprising a cationic latex prepared by the emulsion-polymerization of a diene in the presence of an emulsifier of an inorganic or organic acid salt of an N-alkylpropylene diaminepolyglycol ether having the formula

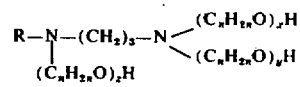

wherein R represents a $C_{12-20}$ saturated or unsaturated aliphatic hydrocarbon radical; $x$, $y$ and $z$ represent 0 or an integer such that $0 < x + y + z \leq 3$; and n represents the integers 2 or 3; and further comprises an alumina sol, asphalt or an asphalt emulsion.

9 Claims, No Drawings

ASPHALT COMPOSITION

BACKGROUND OF THE INVENTION

1. Field of the Invention:

The present invention relates to a process for preparing an asphalt composition.

2. Description of the Prior Art:

A cationic asphalt emulsion has been widely used for asphalt pavement or road repair. The cationic asphalt which can be easily applied is highly adhesive to aggregates because of the cationic nature of the asphalt and it has a high demulsifying velocity which advantageously permits rapid reopening of the paved area to traffic. However, the physical properties of conventional cationic asphalt emulsions are not satisfactory.

Accordingly, various efforts for improving the physical properties without sacrificing the advantages of the asphalt emulsion, especially by improving the physical properties by adding a latex which also lengthens the life of the paved road and decreases road repair, have been undertaken. However, most conventional latexes are anionic or nonionic or contain anionic or nonionic surfactants. The cationic asphalt emulsion will combine with an anionic latex only with difficulty. Although a nonionic emulsified latex can be combined with a cationic asphalt emulsion, the high demulsifying property of the cationic asphalt emulsion will be disadvantageously decreased, and the surfactant will remain in the asphalt after demulsification, whereby the physical properties will disadvantageously be affected and satisfactory results will not be obtained.

The preparation of a cationic latex by emulsion-polymerization in the presence of a cationic emulsifier while preventing coagulation by adding a nonionic or amphoteric emulsifier in the resulting latex, whereby the ionic characteristic is inverted, is known in the prior art. The cationic nature of the latex prepared by the process is greatly reduced because a non-cationic emulsifier is included in the latex, and the adhesion of the latex to aggregates, its tackiness and rapid demulsifying properties are disadvantageously inferior to conventional cationic emulsions.

A polychloroprene latex prepared by using a cationic emulsifier is also known. However, the known polychloroprene latex is a gel polymer (benzene-insoluble polymer) so that molten asphalt can not be swelled or dissolved and an improved effect will not result. A need exists therefore for a cationic latex asphalt which will overcome the disadvantages of the prior art and which will combine the advantages of a cationic asphalt emulsion and a latex.

SUMMARY OF THE INVENTION

Accordingly, one object of the invention is to provide a latex-asphalt composition which readily adheres to aggregates, and which possesses a high demulsifying velocity and has improved physical properties which prolong the lifetime of the composition.

This object and other objects of the invention as will hereinafter become more readily understood can be attained by a latex-asphalt emulsion composition comprising a cationic latex prepared by emulsion-polymerization of a diene in the presence of an emulsifier which is an inorganic or organic acid salt of an N-alkylpropylene diamine-polyglycol ether, having the formula

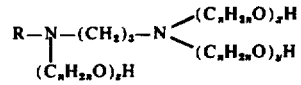

wherein R represents a $C_{12-20}$ saturated or unsaturated aliphatic hydrocarbon radical; $x$, $y$ and $z$ represent 0 or an integer such that $0 < x + y + z \leq 3$; n represents the integers 2 or 3; and further adding an alumina sol, a $C_{4-14}$ n-alkyl mercaptan or a $C_{4-8}$ dialkyl xanthogendisulfide, to the asphalt or an asphalt emulsion, and if desirable aggregates or fillers.

DETAILED DESCRIPTION OF THE PREFERRED EMBODIMENTS

Suitable latexes for use in the present invention include diene polymer latexes prepared by the emulsion-polymerization of a monomer such as 2-chlorobutadiene-1,3 (chloroprene), isoprene, styrene-butadiene, butadiene, acrylonitrile-butadiene, or the like, or a mixture thereof. A cationic latex prepared by polymerizing the monomer in the presence of a cationic emulsifier in order to form a cationic latex-asphalt emulsion, is preferable. A sol polymer having a suitable molecular weight, which can dissolve in molten asphalt, is preferably incorporated to impart suitable physical properties.

A suitable emulsifier for the cationic latex of the present invention includes an inorganic or organic acid salt of an N-alkylpropylene diaminepolyglycol ether having the formula

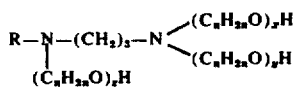

wherein R represents a $C_{12-20}$ saturated or unsaturated aliphatic hydrocarbon radical; $x$, $y$ and $z$ represent 0 or an integer such that $0 < x + y + Z \leq 3$; and $n$ represents the integers 2 or 3. The total of $x + y + z$ is preferably small, so that the cationic nature will be high and the latex will not adversely affect the adhesion to aggregates or the tackiness of the product. After the processing, the emulsifier will remain on the surface of the aggregates in an insoluble form as may be seen from the formula which is not in the acid salt form. Accordingly the physical property improvement can be effectively achieved. However, when an emulsifier having a total $x + y + z$ content of greater than or equal to 4 is used for the latex, the hydrophilicity will increase, the cationic nature will decrease, and the nonionic nature will increase because of the increase in ethyleneoxide moieties. Even though the asphalt is modified with a latex containing an emulsifier with a large number of ethyleneoxide moieties, the adhesion to aggregates, tackiness and demulsification of the latex-asphalt emulsion will be inferior, so that improved physical properties of the asphalt after the application will not result.

Suitable organic acids for the emulsifier include aliphatic carboxylic acids, e.g. formic acid, acetic acid, propionic acid and oxalic acid; suitable inorganic acids for the emulsifier include hydrochloric acid, sulfuric acid and phosphoric acid. Acetic acid and hydrochloric acid are especially preferable. The concentration of the N-alkylpropylenediaminepolyglycol ether salt is usually 1 to 10 wt. %, preferably 2–6 wt. %, of the monomer. The diene type polymer latex used for the invention may be prepared by an O/W emulsion-polymerization method in the presence of an alumina sol, which stabilizes the polymerization.

The preferred dimensions of the colloidal alumina particles are 50 - 100 mμ average length and 5 - 10 mμ average width. The alumina is in feather or fibrile form which is dispersed and stabilized with an organic acid, such as a $C_{1-4}$ aliphatic acid, e.g., oxalic acid, formic acid, acetic acid, propionic acid; or an inorganic acid, such as hydrochloric acid, sulfuric acid, nitric acid, phosphoric acid or the like, preferably hydrochloric acid or acetic acid. Exemplary colloidal aluminas include alumina sol and baymated granulated alumina. The colloidal alumina is added in a quantity of 0.05 - 5 weight %, preferably 0.1 - 1.5 weight %, as solid $Al_2O_3$ to the monomer. The colloidal alumina may be prepared by adding aluminum powder to an acid solution, thereby forming a solution of the aluminum salt. Depending upon the physical properties required for the asphalt, a sol polymer having a suitable molecular weight may be formed by adding a polymerization-modifier such as $C_{4-14}$ n-alkylmercaptan or a $C_{4-8}$ dialkylxanthogendisulfide. When the polymerization-modifier is added to the extent of 0.001 - 0.05 mol %, most preferably 0.004 - 0.01 mol %, to the monomer, a suitable sol polymer is obtained.

The diene type polymer latex can be blended with the cationic asphalt emulsion at the place of application to modify the latex. The diene type polymer latex can be added to an aqueous solution of a cationic emulsifier and molten asphalt emulsified in the aqueous solution to prepare the asphalt emulsion. The diene type polymer latex can be mixed with the molten asphalt to emulsify the asphalt without another emulsifying agent. The cationic latex asphalt composition is suited for industrial preparation. Conventional processes used for preparing asphalt emulsions can be applied. Suitable antipeeling agents or surfactants may be added.

The diene type polymer latex can be added to the asphalt depending upon the ultimate use, for example, addition of 1 - 50% by weight to the asphalt when the latex-asphalt composition is to be used for asphalt pavement (to surface a road). The asphalt combined with the latex can also include plastic residues obtained from coal, coal tar distillates, petroleum pitch, petroleum resin, or the like.

The latex-asphalt composition of the invention has a cationic nature and excellent physical properties, so that the composition can be used for road pavement with aggregates, and also for coating rooves, floors, walls, pipes or the like to impart water proofing or corrosion resistance, and for adhering floor tile. The latex-asphalt composition can be used in fields wherein conventional asphalt emulsions have been used. The characteristic advantages of the asphalt composition of the invention are as follows.

1. Demulsification is rapid and reopening of roads to traffic after processing is hastened.

2. The quantity of the cationic emulsifier used for the preparation of the asphalt emulsion can be decreased. The asphalt can be emulsified with the latex if desired.

3. Desired latex-asphalt emulsions which are suitable for various uses depending upon the condition of the roads and method of processing, can be prepared by controlling the conditions of the preparation of the diene type polymer latex.

Having generally described the invention, a further understanding can be obtained by reference to certain specific examples which are provided herein for purposes of illustration only and are not intended to be limiting in any manner. In the examples below, the term "part" indicates "part by weight."

EXAMPLE 1

A. Preparation of Polychloroprene:

A reactor equipped with a stirrer, a reflux condenser, a specific gravity meter and nitrogen gas inlet and outlet tubes was charged with 100 parts of chloroprene monomer containing 0.35 parts of n-octylmercaptan.

To the monomer were added 125 parts of an aqueous solution of the emulsifier containing 0.4 part of alumina sol and 3 parts of N-tallow oil alkylpropylenediaminepolypropyleneglycol ether (3 moles of propyleneoxide adduct) and glacial acetic acid required for neutralization, with high speed stirring to prepare the chloroprene monomer emulsion. After purging the reactor with nitrogen, 0.015 part of t-butyl hydroperoxide was added to the emulsion and the mixture was heated to 30°C. Sodium formaldehydesulfoxylate was added dropwise at a rate of 0.0025 part per hour to induce polymerization. The degree of polymerization was followed by monitoring the specific gravity. The addition of the reducing agent was stopped 6 hours after initiation of the reaction when the monomer conversion was 98%, and the reaction mixture was maintained at the same temperature for 5 hours. The resulting latex had 40% solid polymer content.

B. Preparation of latex-asphalt composition:

A mixture of 60 parts of straight asphalt heated to 125° - 140°C (needle penetration of 80/100) and 40 parts of a mixture of 0.2 part of tallow oil alkylpropylenediamine, 0.2 part of hydrochloric acid and 0.6 part of calcium chloride, the above latex (solid polymer content 1, 3, 5 or 7% of asphalt by weight) and the balance water, was prepared and heated to 30° - 50°C, with stirring in a homogenizer, to prepare a cationic polychloroprene-asphalt emulsion composition. Each sample prepared depending on the solid polymer content of the latex was dried under reduced pressure and the properties of the residue were measured. The results are shown in Table 1. As a reference, the process was repeated without admixing the polychloroprene latex. The properties of the residue are also shown in Table 1.

TABLE 1

Properties of residues of the latex or non-latex-asphalt emulsion composition:

| Solid polymer content in asphalt (%) | Softening temperature (°C)1) | Toughness (Kg-cm)2) | Tenacity (Kg-cm) 3) | Elongation (%)4) |
|---|---|---|---|---|
| 0 | 39.0 | 10.0 | 2.0 | 6.9 |
| 1 | 42.5 | 29.0 | 14.0 | 32.7 |
| 3 | 46.5 | 36.0 | 23.0 | 28.8 |
| 5 | 48.0 | 68.1 | 47.2 | 31.4 |
| 7 | 51.0 | 79.0 | 61.0 | 34.8 |

Note:
1)Japanese Industrial Standard K 235.
2),3),4)J. R. Benson "Roads and Streets" April, 1955, pages 138-142. (test conditions 23°C; 300 mm/min pull speed.)

As is clear from the results, the polychloroprene latex acts to improve the physical properties of the asphalt.

EXAMPLE 2

The process of Example 1 was repeated in the same reactor except that 0.25 part of n-hexyl mercaptan was added instead of n-octyl mercaptan, and 3 parts of N-oleylpropylenediaminepolypropyleneglycol (2 moles of propyleneoxide adduct) were added instead of N-tallow oil alkyl propylenediamine-polypropyleneglycol ether. The polymerization was performed at 45°C, in the preparation of the polychloroprene latex. In the homogenizer, 20 parts of the latex were heated to 30°–40°C and 80 parts of straight asphalt (needle penetration of 60/80) melted at 150°C were added to immediately form a high concentration latex-asphalt emulsion composition. The sample was dried under reduced pressure. The properties of the residue are shown in Table 2. The properties of the asphalt residue are also shown in Table 2.

TABLE 2

|  | Softening temperature (°C) | Toughness (Kg-cm) | Tenacity (Kg-cm) | Elongation (%) |
|---|---|---|---|---|
| Latex-asphalt composition | 55 | 219.5 | 175.2 | 21.0 |
| Non-latex asphalt composition | 46 | 62.0 | 7.2 | 5.7 |

EXAMPLE 3

The process of Example 1 was repeated except that 3 parts of N-oleylpropylenediamine hydrochloride were used instead of N-tallow oil alkylpropylenediamine polyethyleneglycol and the polymerization was performed at 40°C using 0.5 part of alumina sol and hydrochloric acid to prepare the polychloroprene latex. In the homogenizer, 10 parts of this latex and 100 parts of straight asphalt (needle penetration of 80/100) melted at 125 − 140°C were mixed to form a latex-asphalt emulsion composition. The sample was dried under reduced pressure. The properties of the residue are as follows.

| Softening temperature | 48.0°C |
|---|---|
| Toughness | 79.0 Kg-cm |
| Tenacity | 61.0 Kg-cm |
| Elongation | 34.8 cm |

EXAMPLE 4

The polychloroprene latex-asphalt emulsion composition of Example 1 was blended with aggregates (high density Ascon). The Marshall stability of the composition was measured by the Marshall test pursuant to ASTM D 1559–62T. The results are shown in Table 3 together with that for a nonlatex-asphalt emulsion composition.

TABLE 3

Marshall stability test:

| Polymer content in the binder | Marshall stability (Kg) | Flow value 1/100 cm |
|---|---|---|
| 0 | 976 | 26 |
| 3 | 1,070 | 32 |
| 5 | 1,123 | 38 |

Note:
1)asphalt = straight asphalt (needle penetration 60/80)
2)binder content = 6% (average)

EXAMPLE 5

A. Preparation of SBR latex:

A cationic SBR latex was prepared by emulsion-polymerization of the following components with an N-lauryl propylenediamine-polyethleneglycol ether (E.O. 2 mole) acetic acid salt emulsifier at 5°C.

| Butadiene | 71.5 |
|---|---|
| Styrene | 28.5 |
| n-dodecyl mercaptan | 0.6 |
| Emulsifier | 3.5 |

| Ferrous sulfate | 0.12 |
|---|---|
| Potassium pyrophosphate | 0.17 |
| Dextrose | 1.0 |
| Alumina Sol | 0.4 |
| Water | 180 |
| Cumene hydroperoxide (catalyst) | 0.125 |

In the emulsion-polymerization, when the conversion reached 7%, the addition of the catalyst was stopped and a polymerization inhibitor (0.1 part of sodium nitrite, 0.2 part of hydroquinone, 0.3 part of d-tert-butyl hydroquinone to 100 parts of the monomers) was added to stop the reaction. The unreacted monomers were separated and phenyl-$\beta$-naphthylamine (1.5% of the solid polymer component in the latex) was added to stabilize the resulting latex.

B. Preparation of latex-asphalt composition:

The SBR latex was concentrated by evaporation to give a 50% solid polymer component. In accordance with the process of Example 1, the concentrated SBR latex was admixed with the asphalt of Example 1, to immediately form a cationic latex-asphalt emulsion composition. The sample was dried under reduced pressure and the properties of the residue were measured. The results are shown in Table 4.

TABLE 4

|  | Softening temperature (°C) | Toughness (Kg-cm) | Tenacity (Kg-cm) | Elongation (%) | Demulsifying time (min.) |
|---|---|---|---|---|---|
| Latex-asphalt composition | 48 | 57 | 39 | 11.2 | 5 |
| non-latex asphalt composition | 39 | 19 | 3 | 1.8 | 8 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A latex-asphalt emulsion composition which comprises a cationic latex prepared by emulsion-polymerizing a diene in the presence of an emulsifier of an inorganic or organic acid salt of an N-alkylpropylene diaminepolyglycol ether having the formula

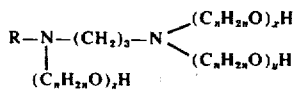

wherein R represents a $C_{12-20}$ saturated or unsaturated aliphatic hydrocarbon radical, $x$, $y$ and $z$ represent 0 or an integer such that $0 < x+y+z \leq 3$, $n$ represents the integers 2 or 3; an alumina sol, and asphalt or an asphalt emulsion.

2. The latex-asphalt emulsion composition of claim 1, wherein the cationic latex is prepared in the presence of a $C_{4-10}$ n-alkyl mercaptan or a $C_{4-8}$ dialkyl xanthogendisulfide.

3. The latex-asphalt emulsion composition of claim 1, wherein the asphalt emulsion is a cationic asphalt emulsion.

4. The latex-asphalt emulsion composition of claim 1, wherein the asphalt is emulsified with the cationic latex.

5. The latex-asphalt emulsion composition of claim 1, wherein the diene is selected from the group consisting of 2-chlorobutadiene-1,3 isoprene, styrene-butadiene, butadiene, acrylonitrile-butadiene and isobutylene.

6. The latex-asphalt emulsion composition of claim 1, wherein the cationic latex contains a dispersed polymer or copolymer of chloroprene.

7. The latex-asphalt emulsion composition of claim 1, wherein the cationic latex contains a sol diene polymer.

8. The latex-asphalt emulsion composition of claim 1, which further comprises an aggregate or filler.

9. The latex-asphalt emulsion composition of claim 1, wherein 1 to 10 weight % of said N-alkylpropylenediaminepolyglycol ether salt is present in the emulsion-polymerization of said diene.

* * * * *